3,167,582
PROCESS FOR THE PREPARATION OF
GLYCINONITRILE
Kenneth Worden Saunders, Darien, William Herbert
Montgomery, Springdale, and James Charles French,
Stamford, Conn., assignors to American Cyanamid
Company, Stamford, Conn., a corporation of Maine
No Drawing. Filed Apr. 12, 1962, Ser. No. 186,876
3 Claims. (Cl. 260—465.5)

This invention relates to the synthesis of nitriles. More particularly, it relates to a novel process for preparing glycinonitrile.

Previously, glycinonitrile has been prepared by several different routes. A classical procedure for its preparation is the ammonolysis of glycolonitrile. According to this method, glycolonitrile, the reaction product of formaldehyde and hydrocyanic acid, is contacted with liquid ammonia or an aqueous or alcoholic solution of ammonia to obtain glycinonitrile.

A second method for the preparation of glycinonitrile involves the reaction of formaldehyde, an alkali metal cyanide and an ammonium halide in the presence of acid. This process, wherein hydrocyanic acid is produced in the reaction vessel, is a modification of an earlier method involving the reaction of formaldehyde, hydrocyanic acid and an ammonium salt.

Finally, it is also known that glycinonitrile may be obtained by the reaction of chloroacetonitrile and ammonia.

In all of these methods, however, numerous disadvantages have been and are readily apparent. It will thus be noted that each of them involves the use of intermediates. For example, glycolonitrile must be prepared prior to the reaction of the first two mentioned procedures. Similarly, in the less commonly practiced third method, chloroacetonitrile must also be first prepared. Additionally, all three methods suffer from a particularly disadvantageous feature, viz., batch or, at best, only semi-continuous procedures may be used. For large scale commercial operation, it is, of course, highly desirable to employ a continuous and simplified synthesis and to avoid, if at all possible, the use of intermediates. The present invention accomplishes all of these objectives in a very straight-forward manner.

It has now been discovered that glycinonitrile may be prepared in a direct one-step synthesis from cheap, widely available starting materials which synthesis not only avoids the use of intermediates found necessary for prior art batch processes but also eliminates the costly processing steps involved in both the preparation of glycinonitrile and its isolation from the reaction mixture.

In accordance with the present invention, therefore, it has now been found that glycinonitrile may be obtained from hydrogen cyanide, formaldehyde and ammonia by critically controlling the mixng of the reactants, the mol ratio of each of the reactants, the temperature and pH of the reaction, and the residence time of the reactants within a reaction chamber. Essentially, our invention may be said to be based upon the principle that hydrogen cyanide, formaldehyde and ammonia may be reacted in a continuous process under certain critically controlled conditions to obtain glycinonitrile. While continuity of operation in any chemical process is always an objective, it is an achievemenet which is not easily realized. It is primarily for this reason that the process of the present invention constitutes such a radical departure from the prior art procedures for the preparation of glycinonitrile.

According to the present invention, the mol ratio of formaldehyde to hydrogen cyanide and the mol ratio of ammonia to hydrogen cyanide, the temperature and pH of the reaction mixture are maintained at critical levels and the feed of all three reactants to a reactor is critically controlled so as to obtain glycinonitrile in extremely high yields in a continuous manner. In carrying out this substantially continuous process, an acid-stabilized aqueous formaldehyde solution is first circulated through the reactor and the system is then brought to operating pressure. To this solution hydrogen cyanide is added and mixed therewith while the pH is maintained below about 4. Ammonia is then added to the formaldehyde-hydrogen cyanide solution and the system is brought to operating temperature. When equilibrium conditions are obtained, which is rapid because of the exothermic nature of the reaction, the feed of all three reactants to the reactor is continued at approximately the same rate, i.e., the mol ratio of the reactants is unchanged. The pH of the solution of reactants within the reactor is maintained at least above 7. During the feed of the reactants to the reactor, product solution is withdrawn continuously from the reactor at a rate so as to permit optimum and critical residence time of the reactants within the reactor.

Glycinonitrile may be isolated by concentration of the product solution following the recovery therefrom of iminodiacetonitrile and N-methylene glycinonitrile, both of which may sometimes be produced during the course of the reaction. Following the removal of ammonia and water from the reaction mass, the concentrate is then distilled. During distillation, it is advantageous to maintain the temperature below about 75° C. in order to minimize partial decomposition. Since glycinonitrile is frequently employed as an intermediate, the necessity for distillation may sometimes be obviated. In such cases, e.g., in the preparation of agricultural and chemotherapeutic agents the concentrate may be used directly. Similarly, in the preparation of glycine, the concentrate may be readily hydrolyzed with acid, e.g., sulfuric acid, and glycine is subsequently recovered as the barium or calcium salt.

It has thus been found that conversions of formaldehyde to glycinontrile of 70 to above 80% and of hydrogen cyanide to glycinonitrile of 70 to about 80% are readily realizable by the process of this invention.

In the process of this invention, the mol ratio of formaldehyde to hydrogen cyanide is maintained at approximately one while the mol ratio of ammonia to hydrogen cyanide is maintained between about 3.5 and 10, and preferably between about 5 and 7.

The temperature of the reaction mixture is maintained at from about 80 to 110° C., and preferably between about 100 and 110° C. It has been found that residence times of the reactants within the reactor of less than about ten minutes are advantageously employed with times of two to six minutes preferred.

The reaction which takes place in the practice of the process of the present invention may be illustrated by the following equation:

$$CH_2O + HCN + NH_3 \rightarrow NH_2CH_2CN + H_2O$$

While the overall process is not limited to the use of a particular type of reaction chamber in which the direct one-step continuous synthesis of glycinonitrile is carried out, it is advantageous to describe equipment of the type which may be used.

The reaction of formaldehyde, hydrogen cyanide and ammonia was carried out in a three-stage continuous tubular reactor designed for a fast exothermic reaction. Each reactor stage consisted of a hair-pin loop of ¼" stainless steel. Thermocouples were placed at the entrance and in the middle of the reactor of each reactor stage. The reactor was surrounded by a jacket to which water from a steam-water mixer was fed continuously countercurrently. The volume of the first second and third stages was 238, 119.5 and 119.5 milliliters, respectively. The valving on this equipment was such that nine different flow patterns were permissible. Although this set up was called a three-stage reactor and could be used as such, the kinetics of the reaction were studied in a single-stage reactor wherein the flow was circulated through the reactor while the volume was 238 milliliters. Alternatively, however, the flow could be circulated through the first and second loops where the volume was 357.5 milliliters or through all three loops where the volume was 477 milliliters. The design of the reactors limited temperatures to 110° C. and pressure to 150 pounds per square inch.

The reactants were pumped and mixed just prior to entry into the first loop of the continuous single-step reactor.

The formaldehyde was fed as an acid-stabilized aqueous solution. Anhydrous ammonia was fed as a liquid from an ammonia storage tank pressurized with nitrogen at 200 p.s.i. Liquid hydrogen cyanide was pumped against a discharge pressure of 175 p.s.i. and the discharge system contained appropriate relief valves to reduce the possibility of back up of reactor product into the hydrogen cyanide feed system. The order of mixing was as follows:

Hydrogen cyanide and acid stabilized formaldehyde were first mixed in a T and immediately following this was a thermocouple inserted to record any temperature rise. In the process of this invention, an exotherm upon such mixing was not observed at this point thus indicating the absence of any reaction between hydrogen cyanide and formaldehyde on the acid side which reaction would have given rise to the possibility that gylcolonitrile was produced in situ. Next in line was a pipe cross, two ports of which served as part of the reactor loop described previously. The formaldehyde-hydrogen cyanide feed entered the third port and ammonia entered the fourth port of the pipe cross.

The formaldehyde employed in the process is ordinarily in aqueous solution advantageously stabilized with methanol in an amount from about 8 to 12%. Commerically available solutions containing 30 to 40% formaldehyde are preferably employed. Solutions containing formaldehyde in higher concentrations may also be used with good success, however. Additionally, it is essential to employ formaldehyde which is also acid stabilized. Acids suitable for stabilization include the mineral acids and, of these, phosphoric acid is preferred. In order to stabilize the formaldehyde and to maintain the pH of the combined formaldehyde-hydrogen cyanide stream at below about 4 until it is admixed with ammonia, the amount of acid generally ranges from about 0.05 to about 0.5%.

In addition to glycinonitrile, N-methylene glycinonitrile and iminodiacetonitrile may also be obtained. Quantitative analysis was employed for determining the amount of glycinonitrile, N-methylene glycinonitrile and ammonia. The reaction product solution was titrated non-aqueously in 1:6-acetonitrile: nitromethane with perchloric acid dissolved in nitromethane. Three breaks in the titration curve indicated in order, ammonia, gylcinonitrile and N-methylene glycinonitrile. Iminodiacetonitrile was then calculated from material balances.

When iminodiacetonitrile is produced in relatively high concentrations, it is isolated by cooling the reaction product whereupon the iminodiacetonitrile is precipitated out and is separated by filtration. The product is recrystallized from hot benzene. A sample melted at 74 to 78° C. (Literature 75 to 77° C.)

*Analysis, percent.*—Theory: C, 50.6; H, 5.26; N, 44.2. Found: C, 49.52; H, 6.63; N, 43.92.

Subsequently, N-methylene glycinonitrile is separated by acidification, e.g., with hydrochloric acid, of the reaction mixture to approximately pH 2.5 to 3.0. The solid is filtered, washed with water and recrystallized from hot water. N-methylene glycinonitrile so obtained melted at 128 to 130° C. (Literature 129° C.)

*Analysis, percent.*—Theory: C, 52.93; H, 5.92; N, 41.15. Found: C, 52.68; H, 6.22; N, 41.19.

In order to illustrate the manner in which the present invention may be carried out in practice to favor the formation of glycinonitrile, the following table summarizes results of various runs, which are not to be considered as limitative examples.

TABLE

*Conversion of $CH_2O$ and HCN to Products*

[Temperature = 100° C.]

| Run | Residence Time (min.) | $CH_2O$ mol/l. | Mol Ratios | | Conversions (percent) | | | |
|---|---|---|---|---|---|---|---|---|
| | | | $CH_2O$ HCN | $NH_3$ HCN | $CH_2O$ to— | | HCN to— | |
| | | | | | GN [1] | IN [2] | GN | IN |
| 1D | 2.4 | 1.85 | 1.0 | 4.0 | 78.7 | 21 | 78.0 | 21 |
| 1E | 3.6 | 1.85 | 1.0 | 4.0 | 72.3 | 26 | 71.3 | 26 |
| 1F | 4.8 | 1.85 | 1.0 | 4.0 | 68.7 | 28 | 67.8 | 28 |
| 6E | 3.6 | 1.98 | 0.6 | 6.6 | 77.8 | 25 | 49.0 | 16 |
| 9E | 3.6 | 2.43 | 1.0 | 3.9 | 82.6 | 16 | 81.9 | 16 |
| 15S | 3.6 | 1.78 | 1.0 | 6.6 | 83.0 | ---- | 83.0 | ---- |

[1] Glycinonitrile.
[2] Iminodiacetonitrile.

From the above data, it will be seen that maximum conversion to glycinonitrile (approximately 83%) appears to be obtained when $CH_2O = HCN = 1.78$ mole/liter, $NH_3 = 11.72$ mols/liter and the temperature about 100° C. It will also be noted that at such optimum conditions, iminodiacetonitrile is also obtained in addition to glycinontrile in the reaction product mixture, but N-methylene glycinonitrile is not obtained.

While the process of the present invention is well adapted to operation in a continuous manner employing a tubular converter under conditions of either viscous or turbulent flow, the reaction may also be conducted in a stirred autoclave or other similar type apparatus.

The process of the present invention is advantageous in view of the increasing commercial importance which glycinontitrile has achieved as an intermediate in the preparation of glycine, for example, by treatment of glycinonitrile with sulfuric acid, as well as in the preparation of glycine amide which may be reacted with 1,2-dicarbonyl compounds to produce hydroxy pyrazines which are useful in the preparation of highly active insecticides and acaracides.

While the present invention has been described in conjunction with various preferred embodiments, it is to be understood that the invention is not to be limited to such exemplary description and is to be construed broadly and limited only by the following claims.

We claim:
1. A continuous process for preparing glycinonitrile which comprises bringing into reactive contact for a period of less than about ten minutes acid stabilized formaldehyde, hydrogen cyanide and ammonia and maintaining during said contact period (a) the mol ratio of $CH_2O/HCN$ at about 1/1;
(b) the mol ratio of $NH_3/HCN$ at between about 3.5/1 and about 10/1;
(c) the temperature at between about 100 and about 110° C.
(d) the pH at greater than 7 and subsequently recovering glycinonitrile from the reaction mixture.

2. A process as in claim 1 in which reactive contact is established by adding ammonia to an aqueous solution of acid stabilized formaldehyde and hydrogen cyanide.

3. A process as in claim 2 in which said aqueous solution of formaldehyde and hydrogen cyanide is maintained at a pH of less than about 4.

References Cited in the file of this patent

UNITED STATES PATENTS

| | | |
|---|---|---|
| 2,405,966 | Loder | Aug. 20, 1946 |
| 2,511,487 | Thompson | June 13, 1950 |